US010690090B2

(12) United States Patent
Caubet et al.

(10) Patent No.: US 10,690,090 B2
(45) Date of Patent: Jun. 23, 2020

(54) DEVICE FOR MODULATING A GAS EJECTION SECTION

(71) Applicant: AIRBUS SAFRAN LAUNCHERS SAS, Paris (FR)

(72) Inventors: Pascal Caubet, Le Haillan (FR); Jean-Michel Larrieu, Macau (FR); Pierre Ripol, Eysines (FR)

(73) Assignee: ARIANEGROUP SAS, Paris (FR)

( * ) Notice: Subject to any disclaimer, the term of this patent is extended or adjusted under 35 U.S.C. 154(b) by 337 days.

(21) Appl. No.: 15/536,448

(22) PCT Filed: Dec. 16, 2015

(86) PCT No.: PCT/FR2015/053542
§ 371 (c)(1),
(2) Date: Jun. 15, 2017

(87) PCT Pub. No.: WO2016/097602
PCT Pub. Date: Jun. 23, 2016

(65) Prior Publication Data
US 2017/0350350 A1 Dec. 7, 2017

(30) Foreign Application Priority Data

Dec. 17, 2014 (FR) .................................... 14 02886

(51) Int. Cl.
*F02K 9/86* (2006.01)
*F02K 9/97* (2006.01)
(Continued)

(52) U.S. Cl.
CPC .................. *F02K 9/86* (2013.01); *F02K 9/38* (2013.01); *F02K 9/566* (2013.01); *F02K 9/80* (2013.01);
(Continued)

(58) Field of Classification Search
CPC .. F05D 2240/1281; F02K 9/566; F02K 9/805; F02K 9/38; F02K 9/80; F02K 9/84; F02K 9/86; F02K 9/976
See application file for complete search history.

(56) References Cited

U.S. PATENT DOCUMENTS 3,230,704 A   1/1966  Lovingham
3,329,089 A   7/1967  Harrison
(Continued)

FOREIGN PATENT DOCUMENTS

JP   S50-034839 B   11/1975
JP   H11-508662 A   7/1999
(Continued)

OTHER PUBLICATIONS

International Search Report as issued in International Patent Application No. PCT/FR2015/053542, dated Apr. 11, 2016.
(Continued)

*Primary Examiner* — Todd E Manahan
*Assistant Examiner* — Thuyhang N Nguyen
(74) *Attorney, Agent, or Firm* — Pillsbury Winthrop Shaw Pittman LLP (57) ABSTRACT

A modulation device for modulating a gas ejection section, the device being for placing in a nozzle upstream from the throat of the nozzle, the modulation device including a plug having a downstream end forming a member for partially obstructing the nozzle throat; and a plug guide having an internal housing in which the upstream end of the plug is present. The upstream end of the plug is suitable for sliding in the internal housing of the plug guide between a first position in which the upstream end of the plug is present in an upstream portion of the internal housing, and a second position in which the upstream end is present in a downstream portion of the internal housing. The upstream end of the plug is held in the first position by at least one retaining element for breaking under the effect of heat.

6 Claims, 6 Drawing Sheets

(51) Int. Cl.
*F02K 9/38* (2006.01)
*F02K 9/80* (2006.01)
*F02K 9/56* (2006.01)
*F02K 9/84* (2006.01)
*F02K 9/10* (2006.01)
*F02K 9/62* (2006.01)

(52) U.S. Cl.
CPC ............. *F02K 9/805* (2013.01); *F02K 9/84* (2013.01); *F02K 9/976* (2013.01); *F02K 9/978* (2013.01); *F02K 9/10* (2013.01); *F02K 9/62* (2013.01); *F05D 2240/1281* (2013.01); *F05D 2260/311* (2013.01)

(56) References Cited

U.S. PATENT DOCUMENTS

| | | | | |
|---|---|---|---|---|
| 3,567,942 | A | * | 3/1971 | Bach ............... G01N 23/16 378/55 |
| 5,044,154 | A | * | 9/1991 | English, Jr. ............... F02K 9/32 60/223 |
| 5,435,128 | A | * | 7/1995 | Miskelly, Jr. ............. F02K 1/08 102/381 |
| 7,565,797 | B2 | * | 7/2009 | Nyberg ..................... F02K 9/08 60/253 |
| 2016/0010591 | A1 | | 1/2016 | Clermont et al. |

FOREIGN PATENT DOCUMENTS

| | | |
|---|---|---|
| KR | 10-1372858 B1 | 3/2014 |
| WO | WO 95/14163 A1 | 5/1995 |
| WO | WO 97/02464 A1 | 1/1997 |
| WO | WO 2014/135789 A1 | 9/2014 |

OTHER PUBLICATIONS

Notice of Reasons for Rejection as issued in Japanese Patent Application No. 2017-532795, dated Sep. 3, 2019.

* cited by examiner

DEVICE FOR MODULATING A GAS EJECTION SECTION

CROSS REFERENCE TO RELATED APPLICATIONS

This application is the U.S. National Stage of PCT/FR2015/053542 filed Dec. 16, 2015, which in turn claims priority to French Application No. 1402886, filed Dec. 17, 2014. The contents of both applications are incorporated herein by reference in their entirety.

BACKGROUND OF THE INVENTION

The present invention relates to the general field of thrusters or rocket engines for delivering thrust for driving vehicles such as missiles, launchers, or indeed satellites, using the principle of propulsion by reaction or by ejecting gas. The invention relates more particularly, but not exclusively, to nozzles fitted to solid propellant thrusters.

A solid propellant thruster is constituted mainly by a shell containing a block of propellant, an igniter, and a nozzle having a stationary diverging portion. The block of propellant is pierced by a channel situated on the axis of the thruster and that serves as a combustion chamber. The igniter ignites the propellant at one end of the shell and combustion of the propellant propagates from the front towards the rear of the thruster. The propellant burns at a predefined speed producing combustion gas, which is expelled through the nozzle.

The throat section of the nozzle serves to regulate the combustion of the block of propellant so as to maintain the desired pressure inside the combustion chamber while also producing the expected thrust. Furthermore, for a thruster that delivers thrust at a single rate, the throat section of the nozzle is single and predetermined as a function of the desired thrust level.

Nevertheless, having recourse to a single throat section is not appropriate for a thruster that has two operating rates, typically operation at a high rate (acceleration) and operation at a low rate (cruising), or for a thruster that is designed to fly at varying altitudes.

To mitigate such a drawback, one known solution consists in providing the launcher with two distinct thrusters: one for the acceleration (or "boost") stage and another for the cruising stage. Nevertheless, such a solution has the drawback of significantly increasing the cost of the launcher.

It is also known to provide a nozzle with a throat section that is variable. In practice, a plug that is movable in translation is housed inside the nozzle. The position of the plug in the flow of combustion gas serves to determine the flow section of the gas leaving the nozzle, thereby adjusting the gas ejection section to the operating rate of the thruster.

Nevertheless, known positioning systems associated with a movable plug are systems that are complex and expensive, and that significantly increase the mass of the thrusters.

There exists a need to modulate the ejection section of a nozzle in a manner that is inexpensive and capable of optimizing the thrust coefficients and to do so while minimizing the size and the mass of the modulation device in the thruster.

OBJECT AND SUMMARY OF THE INVENTION

This object is achieved by a modulation device for modulating a gas ejection section, the device being for placing in a nozzle upstream from the throat of said nozzle, the modulation device comprising:
  a plug extending between an upstream end and a downstream end, said downstream end having a diameter that decreases so as to form a member for partially obstructing the nozzle throat; and
  a plug guide having an internal housing in which the upstream end of the plug is present;
  the upstream end of said plug being suitable for sliding in the internal housing of the plug guide between a first position in which the upstream end of the plug is present in an upstream portion of the internal housing, and a second position in which the upstream end is present in a downstream portion of the internal housing, the upstream end of the plug being held in the first position by at least one retaining element suitable for breaking under the effect of heat.

The device of the invention for modulating the gas ejection section proposes a solution that is simple, inexpensive, and compact, making it possible to define two modes of operation for a nozzle, namely a first mode of operation at a high flow rate in which the partial shutter member is axially set back from the throat of the nozzle, and a second mode of operation at a low rate in which the partial shutter member is advanced axially towards the throat. The passage from the first mode of operation to the second mode of operation is achieved by breaking the retaining element(s). The use of one or more fusible retaining elements in combination with a plug and a plug guide makes it possible to define an architecture for variable throat section nozzles that is inexpensive, simple, and reliable, and to do so without significantly increasing the mass and the size of the thruster.

In addition, the device of the invention for modulating the gas ejection section makes it possible to avoid using two distinct thrusters (one thruster for the acceleration stage ("booster") and another thruster for the cruising stage) and, consequently, makes it possible to propose a low cost propulsion system enabling two rates of operation to be provided.

According to a first characteristic of the device of the invention for modulating the gas ejection section, the retaining element(s) is/are made of a material suitable for breaking as from a determined temperature.

The invention also provides a nozzle of variable throat section including a nozzle throat and characterized in that it further includes a modulation device of the invention for modulating the gas ejection section, said modulation device being placed in the nozzle upstream from said nozzle throat.

According to a particular characteristic of the nozzle of the invention, the nozzle is an aerospike type nozzle, i.e. a nozzle operating without a diverging portion, thereby decreasing simultaneously the cost, the mass, and the size of the thruster while making it possible to optimize the thrust of the vehicle regardless of the altitude at which it is operating.

The invention also provides a thruster including a nozzle of variable throat section of the invention.

According to a particular characteristic of the thruster of the invention, it comprises a shell containing a propellant charge, the nozzle of variable throat section being connected to the rear end wall of said shell by an extension or by a hinged connection.

BRIEF DESCRIPTION OF THE DRAWINGS

Other characteristics and advantages of the present invention appear from the following description given with reference to the accompanying drawings, which show an embodiment having no limiting character. In the figures.

DETAILED DESCRIPTION OF THE INVENTION

The device of the invention for modulating the gas ejection section may be used with any type of nozzle, and in particular with nozzles optionally including a diverging portion.

Figure 1A:
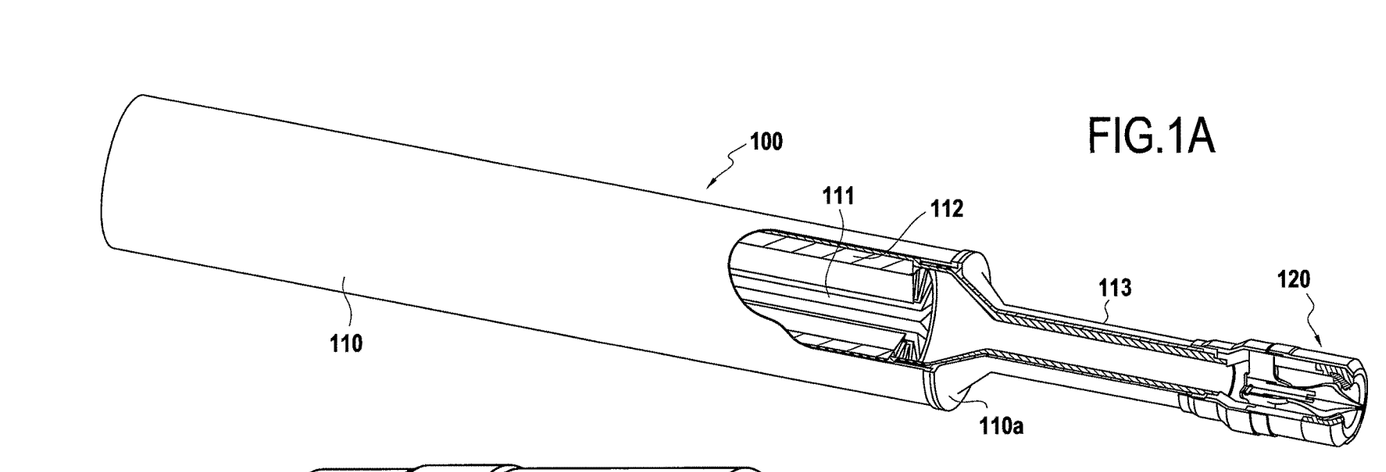
FIGS. 1A and 1B are diagrammatic perspective views, partially in section, showing a thruster fitted with an aerospike nozzle incorporating a device in an embodiment of the invention for modulating the gas ejection section.

FIG. 1A is a diagrammatic longitudinal section view of the rear portion of a thruster 100 comprising a shell 110 in the form of a cylinder of revolution surrounding a combustion chamber 111 housing a block of solid propellant 112. The chamber 111 opens out through the rear end wall 110a of the shell 110, into the upstream end of a nozzle 120 of the "aerospike" type. The term "aerospike nozzle" is used herein to mean a nozzle that has practically no diverging portion and that includes a plug of convex profile that can emerge through its throat. In the presently-described embodiment, the nozzle 120 is connected to the rear end wall 110a by an extension 113. Nevertheless, in a variant embodiment of a thruster of the invention, the nozzle 120 could equally well be connected directly to the rear end wall of the shell of the thruster, i.e. without any extension 113. In yet another variant embodiment of the thruster of the invention, the nozzle may be connected to the rear end wall of the shell of the thruster via a hinged connection, e.g. such as a ball joint, so as to enable the nozzle to be steered in a plurality of directions relative to the axis of the shell of the thruster.

Figure 1B:
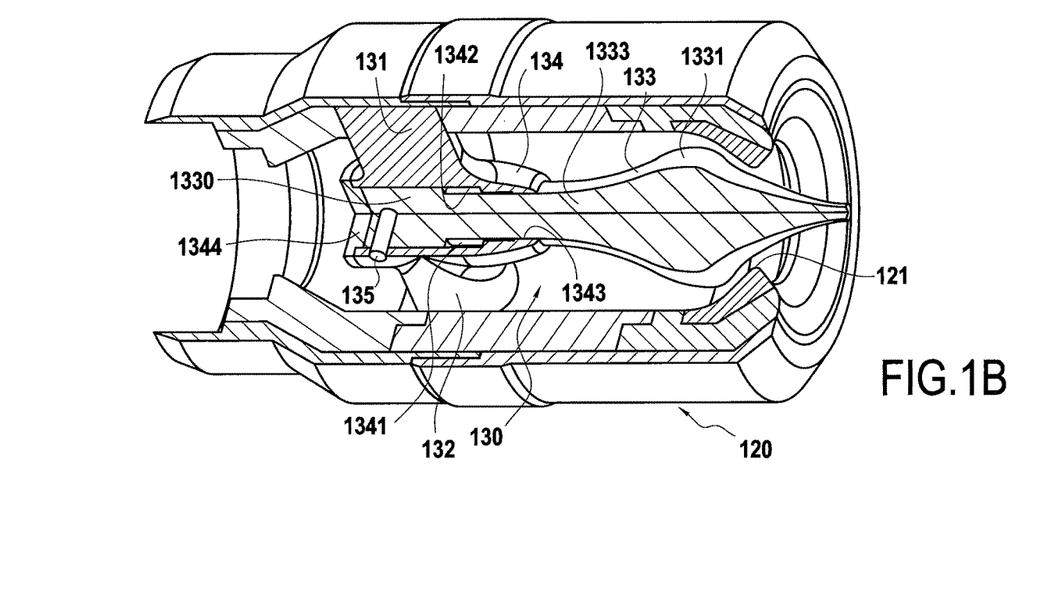

In accordance with the invention, a device 130 for modulating the gas ejection section is arranged inside the throat 121 of the nozzle 120 (FIG. 1B). In the presently-described example, the modulation device 130 is held in position by two arms 131 and 132 that are fastened to the inside wall of the nozzle 120. The arms 131 and 132 are arranged at 180° relative to each other, and the remainder of the circumferential space around the modulation device is left empty to allow the gas coming from the combustion chamber 111 to flow towards the nozzle throat 121. The device 130 for modulating the gas ejection section includes a plug 133 having a rod 1333 extending between an upstream end 1330 and a downstream end 1331, said downstream end 1331 having a diameter that decreases so as to form a member for partially obstructing the nozzle throat 121. The modulation device 130 also has a plug guide 134 comprising a wall 1342 defining an internal housing 1341 in which the upstream end 1330 of the plug 133 is present. The plug guide 134 also has a passage 1343 supporting the rod 1333 of the plug and guiding its movements.

Figure 2A:
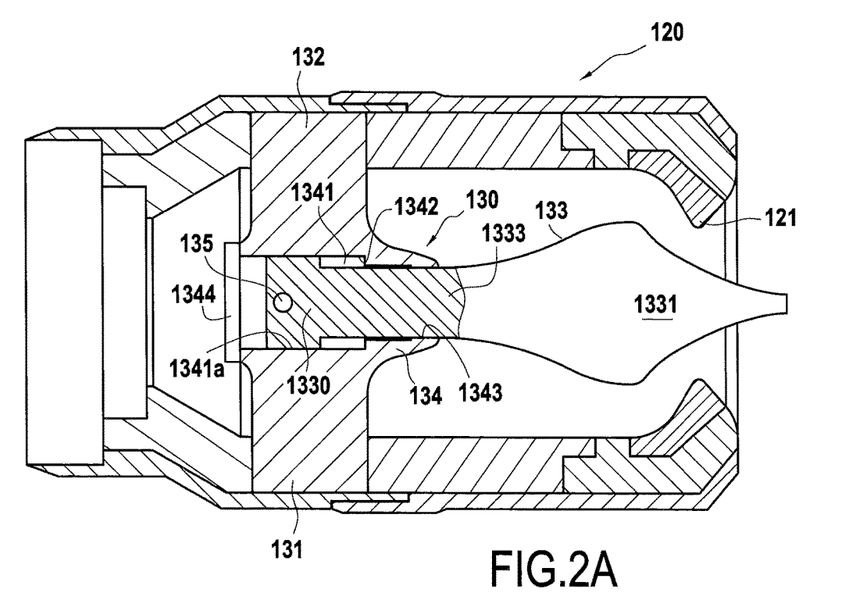
FIGS. 2A and 2B are diagrammatic longitudinal section views of the nozzle of FIGS. 1A and 1B.
Figure 2B:
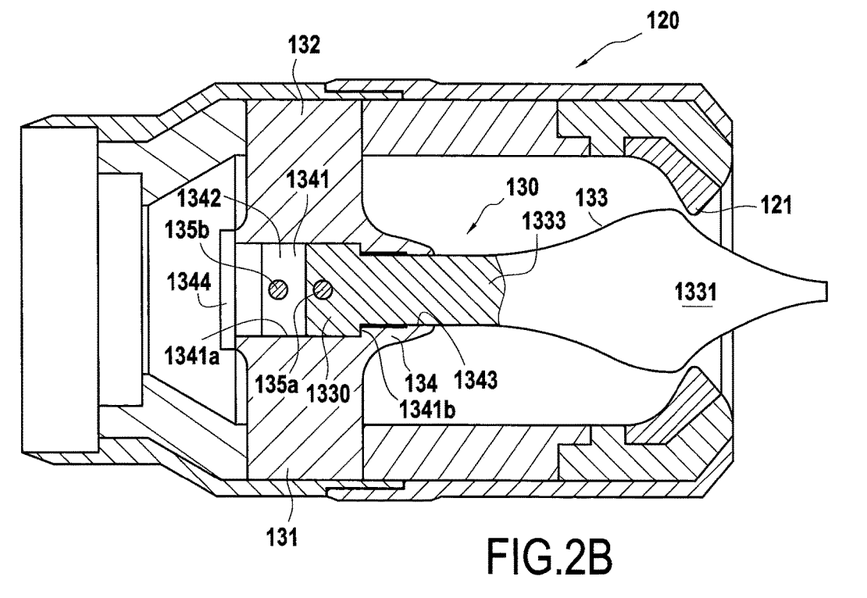

As shown in FIGS. 2A and 2B, the upstream end 1330 of the plug can slide in the internal housing 1341 of the plug guide 134 between a first position in which said upstream end 1330 of the plug 133 is present in an upstream portion 1341a of the internal housing 1341 (FIG. 2A) and a second position in which the upstream end 1330 is present in a downstream portion 1341b of the internal hosing 1341 (FIG. 2B).

In accordance with the invention, the upstream end 1330 of the plug 133 is held in the first position by a retaining element, in this example a pin 135 that passes both through the upstream end 1330 of the plug and the wall 1342 of the plug guide 134. In the presently-described embodiment, the pin 135 is made of a material that is suitable for giving way, by melting or by softening, from a determined temperature. As examples:

- for a plug-release temperature determined to be around 85° C., the pin 135 may be made in particular out of acrylonitrile butadiene styrene (ABS);
- for a plug-release temperature determined to be around 400° C., the pin 135 may in particular be made of aluminum; and
- for a plug-release temperature determined to be greater than 800° C., the pin 135 may in particular be made of a shape memory metal alloy.

Shape memory alloys can be used in general manner to make the retaining element(s) of the device of the invention, with their composition being determined as a function of the intended plug-release temperature.

During the first stage of flight of the thruster, referred to as an "acceleration" stage, the device 130 for modulating the gas ejection section is in the configuration shown in FIG. 2A, in which configuration the downstream end 1331 of the plug 133 is set back from the nozzle throat 121 so as to generate strong thrust and so as to adapt to the altitude level that is to be encountered during this first stage of flight. During this first stage of flight, the combustion gas flowing through the nozzle 120 transmits heat to the pin 135. Once the rupture temperature of the pin 135 is been reached (its melting or softening temperature), it loses its mechanical integrity and no longer acts as an element for retaining the upstream end 1330 of the plug 133, which plug then moves (in translation) into the position shown in FIG. 2B under the suction effect of pressure forces generated in the nozzle. A first portion 135a of the pin 135 then remains in the upstream end 1330 of the plug, while a second portion 135b remains in the wall 1342 of the plug guide. The configuration shown in FIG. 2B corresponds to the second stage of flight of the thruster, referred to as the "cruising" stage, in which configuration the downstream end 1331 of the plug 133 comes closer to the nozzle throat 121 so as to generate reduced thrust adapted to systems requirements in this second stage of flight.

In the presently-described embodiment, the upstream portion 1341a of the internal housing 1341 is closed by a stopper 1344 made of a material presenting thermal conductivity that serves to slow down the transmission of heat from the gas to the pin, and consequently to retard the instant at which the pin breaks. The stopper may be made in particular out of a carbon/carbon (C/C) composite material comprising a carbon fiber reinforcing texture densified by a pyrolytic carbon matrix, out of a low density ceramic matrix composite (CMC) material comprising a reinforcing texture made of refractory fibers (carbon or ceramic), densified by a matrix that is at least partially ceramic, or out of an organic matrix composite (OMC) material comprising a reinforcing texture made of refractory fibers (carbon or ceramic) densified by an organic matrix (resin). Nevertheless, the modulation device may also be used without closing the upstream portion 1341*a* of the internal housing 1341.

Figure 3A:
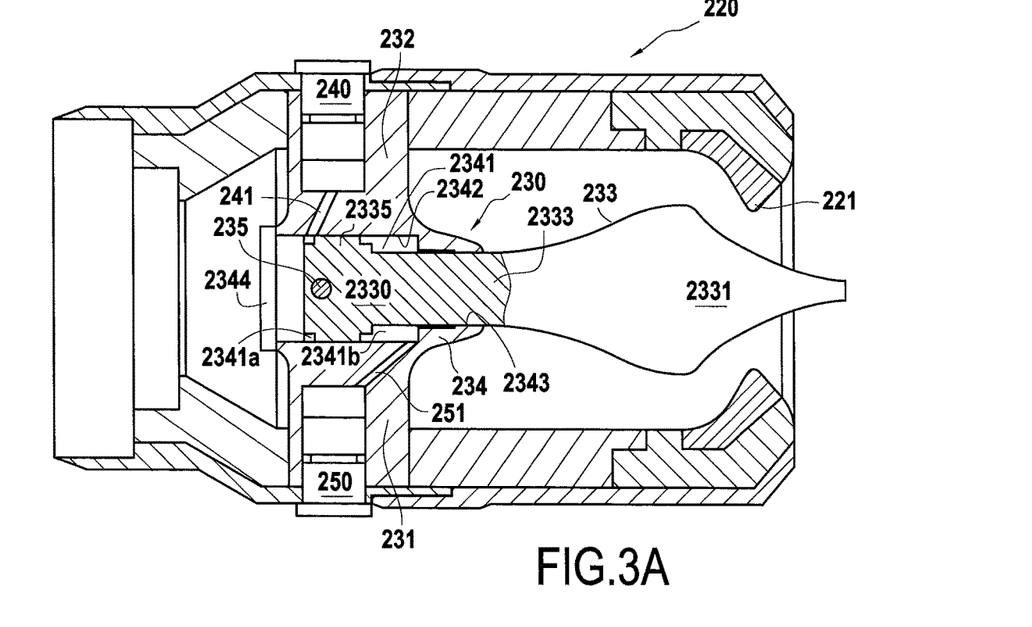
FIGS. 3A and 3B are diagrammatic longitudinal section views of an aerospike nozzle incorporating a device for modulating the gas ejection section in accordance with another embodiment of the invention.
Figure 3B:
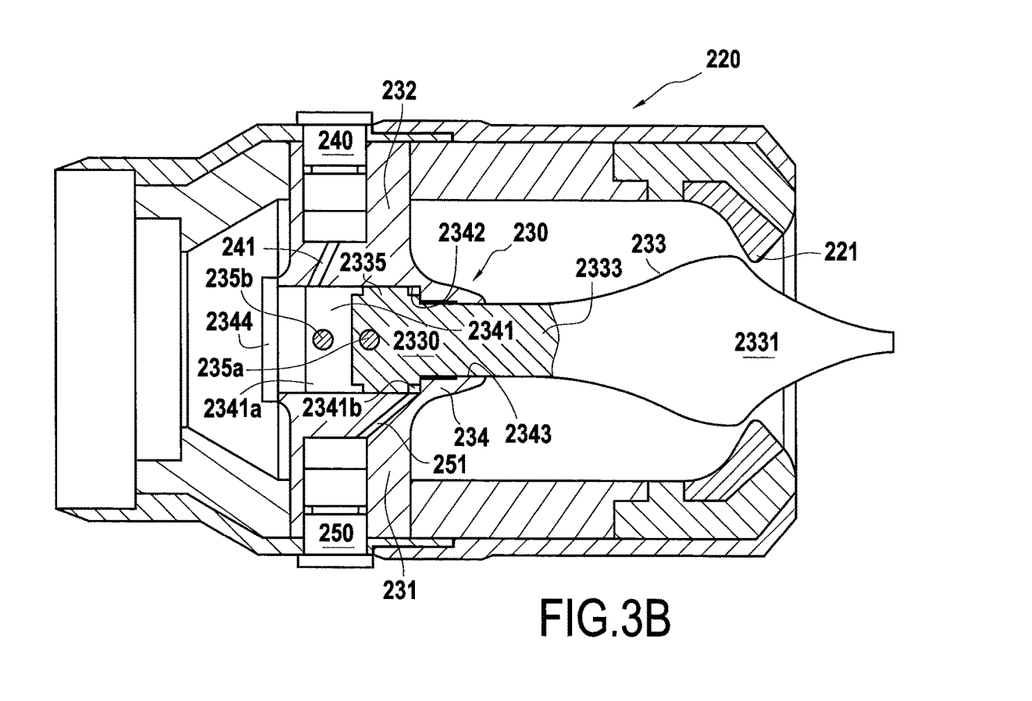

FIGS. 3A and 3B show a nozzle 220 that has a device 230 for modulating the gas ejection section in accordance with another embodiment of the invention. The modulation device 230 differs from the above-described device 130 in that the pin 235 which passes both through the upstream end 2330 of the plug and the wall 2342 of the plug guide 234 no longer gives way under the effect of heat, but under the effect of a mechanical force exerted on the upstream end 2330 of the plug. More precisely, and as shown in FIG. 3A, the upstream end 2330 of the plug 233 has a shoulder 2335 in contact with the wall 2342 of the plug guide 234 that defines the internal housing 2341 in which the upstream end 2330 of the plug 233 is present. The device 230 for modulating the gas ejection section further includes a gas generator, in this example a pyrotechnic cartridge 240 housed in the arm 232 of the modulation device. The pyrotechnic cartridge 240 is suitable for acting on command to send gas under pressure into the upstream portion 2341*a* of the internal housing 2341 between the upstream end wall 2344 of said internal housing and the shoulder 2335 so as to break the pin 235 and cause the upstream end 2330 of the plug 233 to slide towards the downstream portion 2341*b* of the internal housing 2341. The pyrotechnic cartridge 240 communicates with the internal housing 2341 via a duct 241 formed in the plug guide 234 between the arm 232 and the internal housing 2341. The pin 235 is dimensioned in such a manner as to break under the pressure force exerted by the pyrotechnic cartridge 240. The pin 235 may in particular be made of aluminum or of steel.

During the first stage of flight of the thruster, referred to as the "acceleration" stage, the device 230 for modulating the gas ejection section is in the configuration shown in FIG. 3A, in which configuration the downstream end 2331 of the plug 233 is set back from the nozzle throat 221 so as to generate strong thrust and adapt to the altitude level that is encountered in this first stage of flight.

Once the first stage of flight has terminated, a control signal is sent to the pyrotechnic cartridge 240 to ignite it. Under the effect of the pressure of the gas introduced by the cartridge 240 into the upstream portion 2341*a* of the internal housing 2341 between the upstream end wall 2344 of said internal housing and the shoulder 2335, the pin 235 breaks, a first portion 235*a* of the pin 235 then remaining in the upstream end 2330 of the plug, while a second portion 235*b* remains in the wall 2342 of the plug guide. By giving way, the pin 235 releases the upstream end 2330 of the plug 233, which moves (in translation) into the position shown in FIG. 3B under the combined effects of the pressure forces exerted by the pyrotechnic cartridge and by the gas flowing in the nozzle. The configuration shown in FIG. 3B corresponds to the second stage of flight of the thruster, referred to as the "cruising" stage, in which configuration, the downstream end 2331 of the plug 233 comes close to the nozzle throat 221 so as to generate reduced thrust adapted to the systems needs of this second stage of flight.

In optional manner, and as shown in FIGS. 3A and 3B, the device 230 for modulating the gas ejection section may also have a second gas generator, in this example a second pyrotechnic cartridge 250, that is housed, in the presently-described embodiment, in the other arm 231 of the modulation device 230. The second pyrotechnic cartridge 250 is suitable for acting on command to send gas under pressure into the downstream portion 2341*b* of the internal housing 2341 between the downstream end wall of said internal housing including the passage 2343 supporting the rod 2333 of the plug 233 and the shoulder 2335. The pyrotechnic cartridge 250 communicates with the internal housing 2341 via a duct 251 formed in the plug 234 between the arm 232 and the internal housing 2341. When a control signal is sent to the pyrotechnic cartridge 250 to ignite while the modulation device 230 is in the configuration shown in FIG. 3B, the plug 233 moves (in translation), this time into the position shown in FIG. 3A under the effect of the pressure introduced by the cartridge 250 between the shoulder 2335 and the downstream end wall of the internal housing 2341.

Figure 4A:
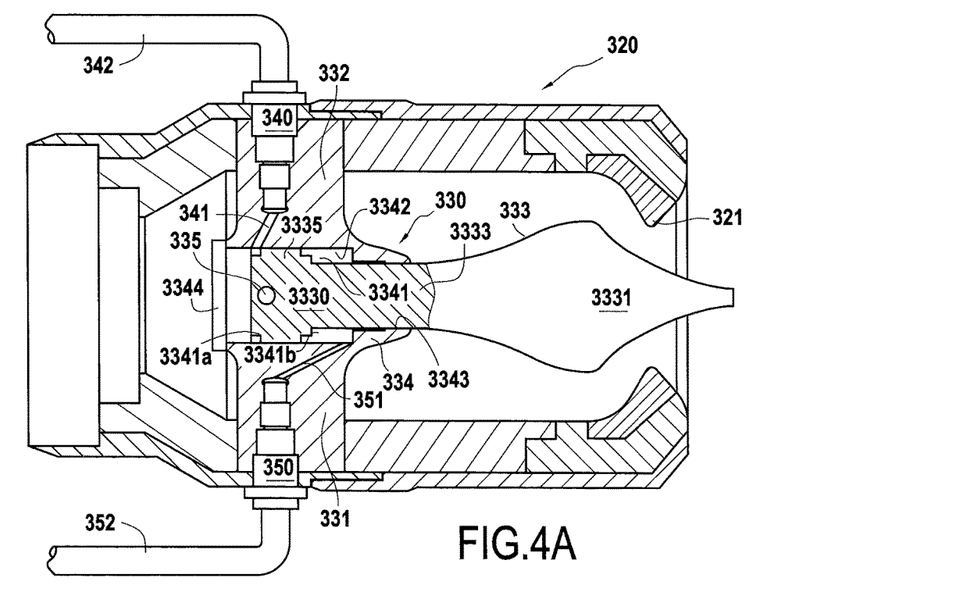
FIGS. 4A and 4B are diagrammatic longitudinal section views of an aerospike nozzle incorporating a device for modulating the gas ejection section in accordance with another embodiment of the invention.
Figure 4B:
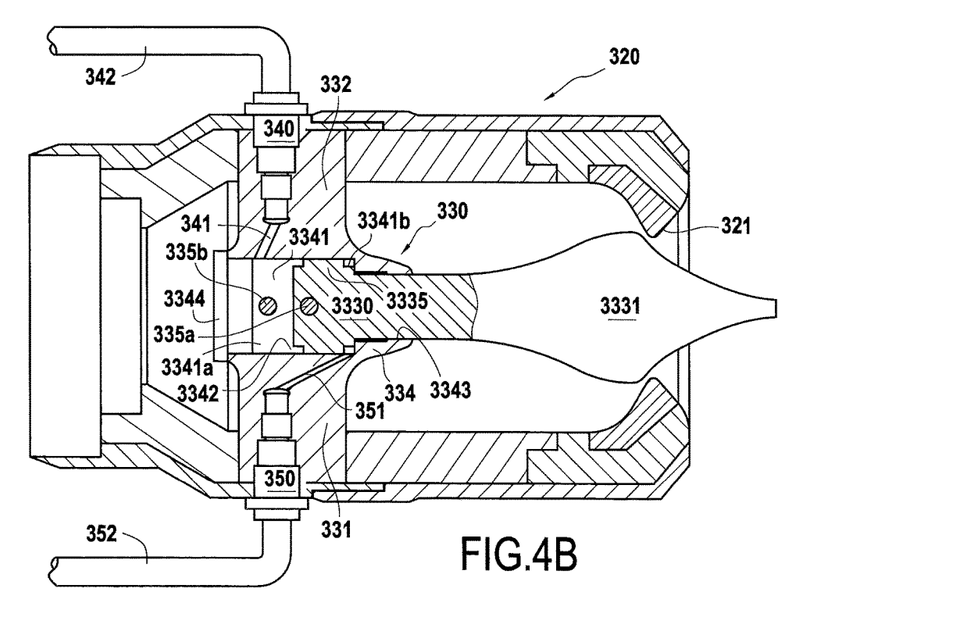

FIGS. 4A and 4B show a nozzle 320 including a device 330 for modulating the gas ejection section and in accordance with another embodiment of the invention. The modulation device 330 differs from the above-described device 230 in that it uses gas taken directly from the combustion gas of the thruster rather than from independent gas generators in order to break the pin 335, which passes both through the upstream end 3330 of the plug and through the wall 3342 of the plug guide 334.

More precisely, as shown in FIG. 4A, the upstream end 3330 of the plug 333 has a shoulder 3335 in contact with the wall 3341 of the plug guide 334 defining the internal housing 3342 in which the upstream end 3330 of the plug 333 is present. The device 330 for modulating the gas ejection section also has a valve 340 housed in the arm 332 of the modulation device. The valve 340 is connected to a duct 342 that opens out into a portion of the thruster from which it is possible to take a fraction of the combustion gas, such as for example into the combustion chamber (not shown in FIGS. 4A and 4B). The valve 340 is suitable, on command, for sending a fraction of the combustion gas into the upstream portion 3341*a* of the internal housing 3341 between the upstream end wall 3344 of said internal housing and the shoulder 3335 so as to break the pin 335 and cause the upstream end 3330 of the plug 333 to slide towards the downstream portion 3341*b* of the internal housing 3341. The valve 340 communicates with the internal housing 3341 via a duct 341 formed in the plug guide 334 between the arm 332 and the internal housing 3341. The pin 335 is dimensioned so as to break under the pressure force exerted by the gas fraction introduced into the internal housing 3341 via the duct 341.

During the first stage of flight of the thruster, referred to as the "acceleration" stage, the device 330 for modulating the gas ejection section is in the configuration shown in FIG. 4A, in which configuration the downstream end 3331 of the plug 333 is set back from the nozzle throat 321 so as to generate strong thrust and so as to adapt to the altitude level encountered during this first stage of fight.

Once the first stage of flight has terminated, a control signal is sent to the valve 340 to cause it to open. Under the effect of the pressure of the gas introduced via the valve 340 into the upstream portion 3341*a* of the internal housing 3341 between the upstream end wall 3344 of said internal housing and the shoulder 3335, the pin 335 breaks, with a first portion 335a of the pin 335 then remaining in the upstream end 3330 of the plug, while a second portion 335b remains in the wall 3342 of the plug guide. By breaking, the pin 335 releases the upstream end 3330 of the plug 333 which moves (in translation) into the position shown in FIG. 4B under the combined effects of the pressure forces exerted by the combustion gas fraction introduced into the internal housing of the plug guide and of the gas flowing through the nozzle. The configuration shown in FIG. 4B corresponds to the second stage of flight of the thruster, referred to as the "cruising" stage, in which configuration the downstream end 3331 of the plug 333 comes closer to the nozzle throat 321 in order to generate reduced thrust adapted to the systems requirements of this second stage of flight.

In optional manner, and as shown in FIGS. 4A and 4B, the device 330 for modulating the gas ejection section may also include a second valve 350 that is housed in the presently-described embodiment in the second arm 332 of the modulation device 330. The second valve 350 is connected to a duct 352 that opens out into a portion of the thruster from which a fraction of the combustion gas can be taken, such as for example into the combustion chamber (not shown in FIGS. 4A and 4B). The second valve 350 is suitable, on command, for sending a fraction of the combustion gas into the downstream portion 3341b of the internal housing 3341 between the downstream end wall of said internal housing including the passage 3343 supporting the rod 3333 of the plug 333 and the shoulder 3335.

The valve 350 communicates with the internal housing 3341 via a duct 351 formed in the plug guide 334 between the arm 332 and the internal housing 3341. When a control signal is sent to the valve 350 to cause it to open while the modulation device 330 is in the configuration shown in FIG. 4B, the plug 333 then moves (in translation) into the position shown in FIG. 4B under the effect of the pressure introduced by the cartridge 350 between the shoulder 3335 and the downstream end of the internal housing 3341.

Figure 5A:
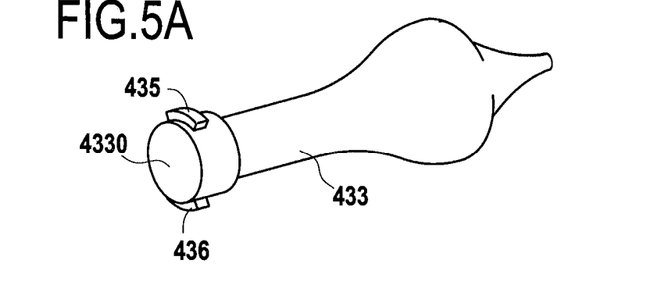
FIG. 5A is a diagrammatic perspective view showing a plug used in the device for modulating the gas ejection section as shown in FIGS. 5B and 5C.
Figure 5B:
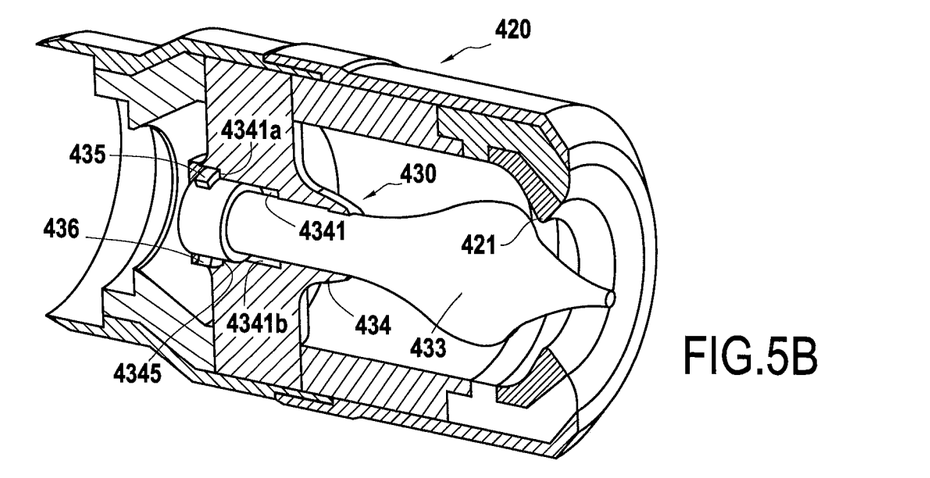
FIGS. 5B and 5C are diagrammatic longitudinal section views of an aerospike nozzle incorporating a device for modulating the gas ejection section in accordance with another embodiment of the invention.
Figure 5C:
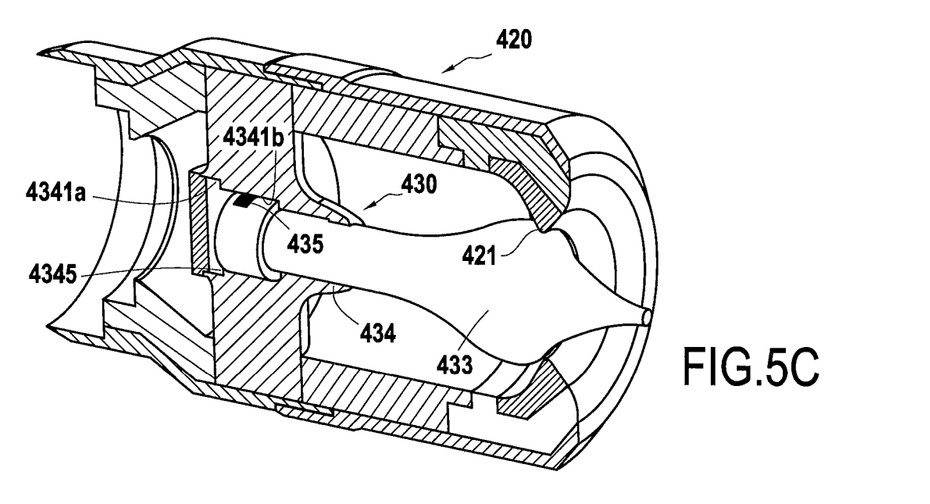

In the above-described embodiments, the retaining element is constituted by a pin. Nevertheless, the way the retaining element is embodied in the present invention is not limited to a pin, and it may present a shape and/or a structure that is different. In a variant embodiment shown in FIGS. 5A, 5B, and 5C, a plug 433 has two keys 435 and 436 forming retaining elements on its upstream end 4330. Under such circumstances, the internal housing 4341 of the plug guide 434 of the device 430 for modulating the gas ejection section has an upstream portion 4341a suitable for housing the upstream end 4330 of the plug 433 together with its two keys 435 and 436, and a downstream portion 4341b presenting dimensions that are smaller than the dimensions of the upstream portion 4341a so as to define an abutment 4345 for the keys 435 and 436. Thus, during the first stage of flight, the plug 433 is held set back from the nozzle throat 421 as shown in FIG. 5B so as to generate strong thrust and adapt to the altitude level encountered in this first stage of flight. Once the first stage of flight has terminated, the keys 435 and 436 are broken, either by heat or by a pressure force, as described above. By giving way, the keys 435 and 436 release the upstream end 4330 of the plug 433, which then advances into the downstream portion 4341b of the housing 4341, thereby enabling the plug to take up the position shown in FIG. 5C, in which position the downstream end 4331 of the plug 433 comes closer to the nozzle throat 421 so as to generate reduced thrust adapted to the systems requirements of this second stage of flight.

Figure 6A:
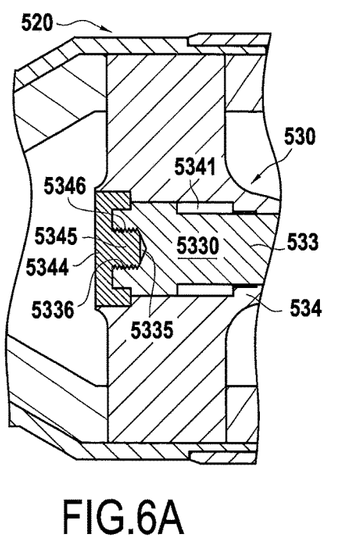
FIGS. 6A and 6B are diagrammatic fragmentary longitudinal section views of an aerospike nozzle incorporating a device for modulating the gas ejection section in accordance with another embodiment of the invention.
Figure 6B:
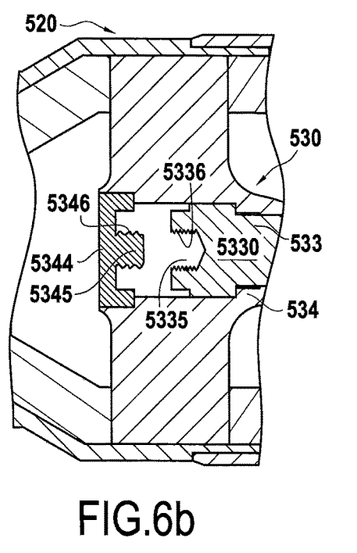

FIGS. 6A and 6B show another variant embodiment of a retaining element suitable for use in the device of the invention for modulating the gas ejection section. In FIG. 6A, a nozzle 520 of the same type as those described above has a device 530 for modulating the gas ejection section, which device comprises a plug 533 and a plug guide 534, the plug retaining element in this example being incorporated in a stopper 5334 that closes the upstream portion of the nozzle 5341 of the device 530. More precisely, on its portion facing the upstream end 5330 of the plug, the stopper 5344 has a stud 5345 with a thread 5346. The upstream end 5330 of the plug 433 has a recess 5335 with tapping 5336 suitable for co-operating with the thread 5346 of the stud 5345. As shown in FIG. 6A, the upstream end 5330 of the plug 533 is screwed onto the stud 5345. The stud 5345 is made of a material that is suitable for giving way, by softening or melting, as from a determined temperature. Once this temperature is reached, the stud 5345 loses its mechanical integrity and no longer acts as an element for retaining the upstream end 5330 of the plug 533, with the thread 5346 or the stud itself breaking under the effect of temperature. Under the suction effect of the pressure forces generated in the nozzle, the plug then moves (in translation) into the position shown in FIG. 6B. Furthermore, the stud 5345 may equally well be dimensioned so as to break under a pressure force exerted by a pyrotechnic cartridge or by introducing a fraction of the combustion gas, as described above.

Figure 7A:
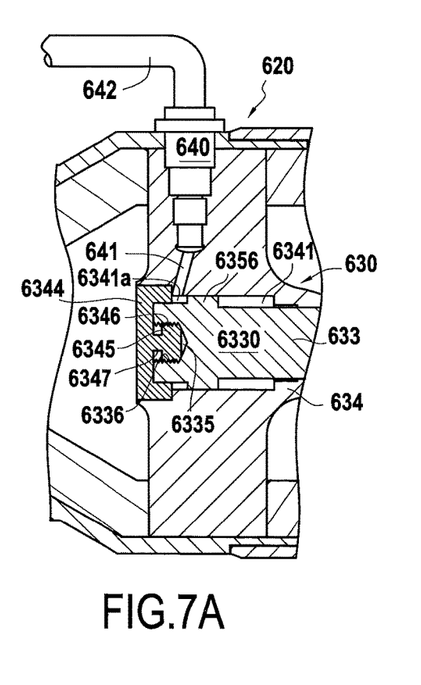
FIGS. 7A and 7B are diagrammatic fragmentary longitudinal section views of an aerospike nozzle incorporating a device for modulating the gas ejection section in accordance with another embodiment of the invention.

FIGS. 7A and 7B show another variant embodiment of a retaining element that can be used in the device of the invention for modulating the gas ejection section. In FIG. 7A, a nozzle 620 of the same type as those described above has a device 630 for modulating its gas ejection section that comprises a plug 633 and a plug guide 634, the retaining element of the plug in this example being incorporated in a stopper 6344 that closes the upstream portion of the internal housing 6341 of the device 630. More precisely, the stopper 6344 includes a stud 6345 on its portion facing the upstream end 6330 of the plug, which stud 6345 has a thread 6346. The upstream end 6330 of the plug 633 has a recess 6335 including tapping 6336 suitable for co-operating with the thread 6346 of the stud 6345. As shown in FIG. 7A, the upstream end 6330 of the plug 633 is screwed onto the stud 6345.

Figure 7B:
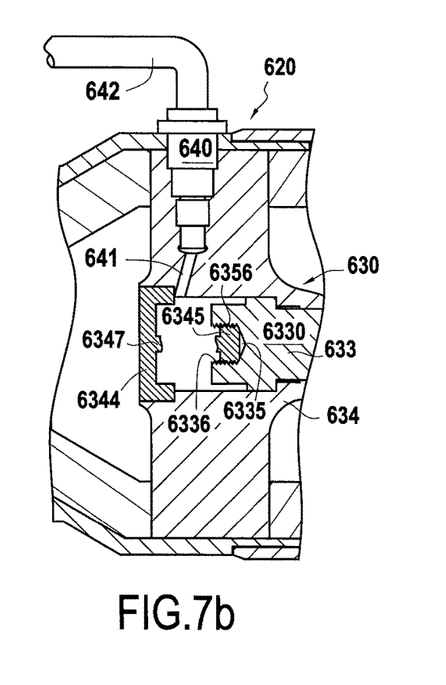

The stud 6345 has a narrowed portion 6347 that is suitable for enabling the stud 6345 to break under a pressure force exerted by introducing a fraction of the combustion gas via a valve 640 and via a duct 641, as described above with reference to FIGS. 4A and 4B. Once the gas fraction has been introduced into the upstream portion 6341a of the internal housing 6341 between the stopper 6344 and the shoulder 6346, the stud 6345 breaks in its narrowed portion 6347. Under the combined effects of the pressure forces exerted by the combustion gas fraction introduced into the internal housing of the plug guide and by the gas flowing through the nozzle, the plug then moves (in translation) into the position shown in FIG. 7B. The stud 6347 together with its narrowed portion may equally well be made out of a material that is suitable for breaking, by softening or melting, from a determined temperature.

The device of the invention for modulating a gas ejection section may be used in thrusters, rocket engines, or solid propulsion launchers (solid propellant), liquid propulsion launchers (liquid propellant), or hybrid propulsion launchers (both solid and liquid propellant).

The invention claimed is:

1. A modulation device for modulating a gas ejection section, the modulation device being for placing in a nozzle upstream from a throat of said nozzle, the modulation device comprising:

a plug extending between an upstream end and a downstream end, said downstream end having a diameter that decreases so as to form a member for partially obstructing the throat;

a plug guide having an internal housing in which the upstream end of the plug is present: the upstream end of said plug being suitable for sliding in the internal housing of the plug guide under a suction effect of pressure forces generated in the nozzle between a first position in which said upstream end of the plug is present in an upstream portion of the internal housing to enable a first thrust, and a second position in which said upstream end is present in a downstream portion of the internal housing to enable a second thrust, lower than the first thrust, the upstream end of said plug being held in the first position by at least one retaining element suitable for melting or softening under an effect of heat; and an outer case surrounding the internal housing, wherein the at least one retaining element is spaced away from a wall of the outer case.

2. The device according to claim 1, wherein the at least one retaining element is made of a material suitable for breaking as from a determined temperature.

3. A nozzle of variable throat section including a nozzle throat and a modulation device according to claim 1 for modulating the gas ejection section, said modulation device being placed in the nozzle upstream from said nozzle throat.

4. The nozzle according to claim 3, wherein the nozzle is an aerospike type nozzle.

5. A thruster including a nozzle of variable throat section according to claim 3.

6. The thruster according to claim 5, comprising a shell containing a propellant charge, the nozzle of variable throat section being connected to a rear end wall of said shell by an extension or by a hinged connection.

* * * * *